S. H. McGIBENY.
Stock-Car.
No. 224,707. Patented Feb. 17, 1880.
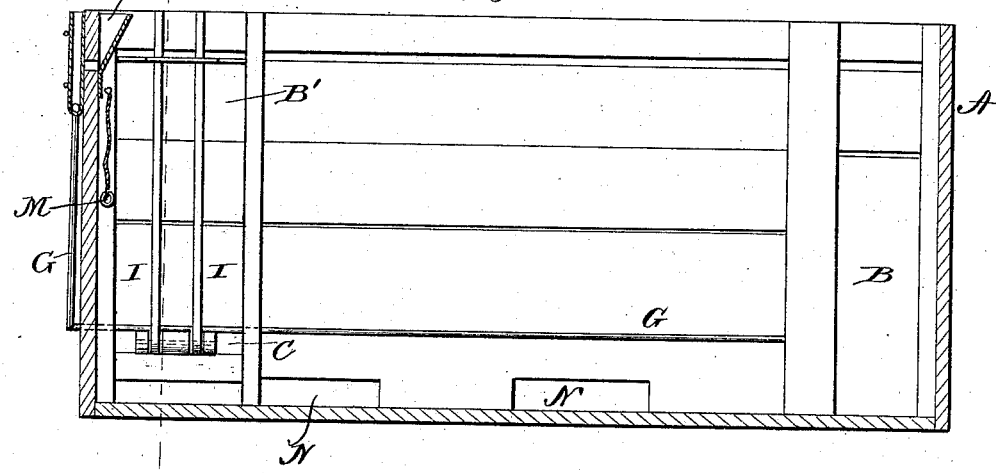
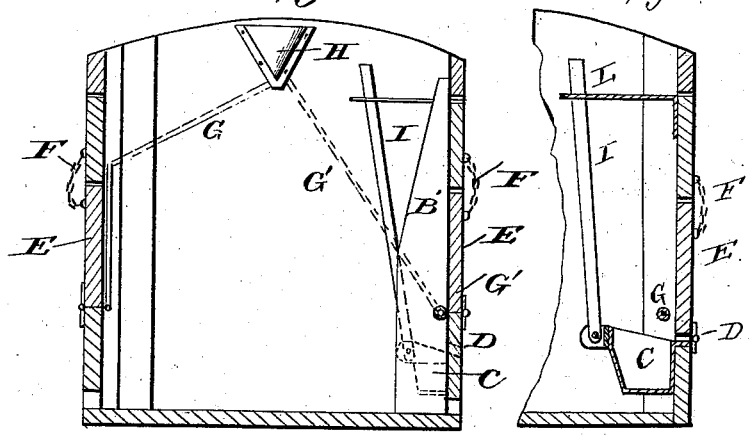
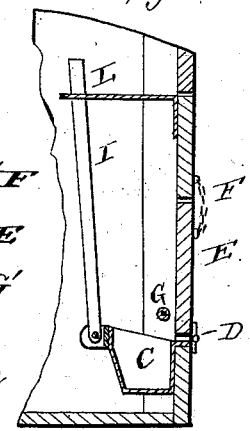
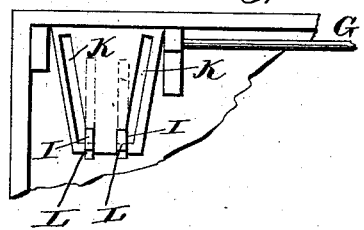
Witnesses
F. L. Durand
E. H. Bradford
Inventor.
S. H. McGibeny
By H. J. Ennis
Attorney
N. PETERS, PHOTO-LITHOGRAPHER, WASHINGTON, D. C.

United States Patent Office.

SYLVESTER H. McGIBENY, OF WEST ALMOND, ASSIGNOR OF TWO-THIRDS OF HIS RIGHT TO RICHARD H. CHARLES, OF ANGELICA, AND FREDRICK M. SHELDON, OF HORNELLSVILLE, NEW YORK.

STOCK-CAR.

SPECIFICATION forming part of Letters Patent No. 224,707, dated February 17, 1880.

Application filed December 11, 1879.

*To all whom it may concern:*

Be it known that I, SYLVESTER H. MC-GIBENY, a citizen of the United States, residing at West Almond, in the county of Allegany and State of New York, have invented certain new and useful Improvements in Live-Stock Cars; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain improvements in cars for transporting live-stock; and it has for its object to provide for conveniently, expeditiously, and humanely feeding and watering the stock while in the car, thus obviating the emptying and reloading of the car for the purpose, which are inconvenient and require much time.

To this end my invention consists in a stock-car having doors on opposite sides, at or near the ends of said car, for the entrance and removal of the animals, and a series of alternating stalls on opposite sides of the interior of the car, provided each with a feed or watering trough and suitable pipes and doors for supplying the water and feed to said troughs, the said stalls being also provided with adjustable stanchions, between which the neck of the animal may be confined, the said stanchions being so arranged that they can be thrown back out of the way when not in use, so as not to interfere with the animals while entering the car.

In the drawings, Figure 1 represents a longitudinal transverse section of my improved car; Fig. 2, a transverse section through one of the stalls; and Fig. 3, a top view of one of the stalls; and Fig. 4 is a sectional view through one of the troughs on the line *x x* of Fig. 1, showing the opening at the side of the car and the flange at the rear of the trough for the escape of the overflow.

The letter A indicates the body of the car, provided with doors B at or near the ends of the same, on opposite sides, for the entrance and exit of the animals. The letter B' represents a series of stalls arranged alternately on opposite sides of the car in such manner that the animals will stand alternately head to rump when properly secured in the stalls.

Each stall is provided with a trough, C, the front of which stands higher than the rear, the rear at its upper edge being formed with a flange extending through an opening, D, in the side of the car, so that any overflow will take place outside instead of inside of the car, thus keeping the car dry and comfortable.

Above the troughs on each side of the car are hinged, at their lower edges, the doors E, which are provided with stop-chains F, attached to the car, which permit the doors to drop only to a sufficient extent for the introduction of the food.

The letter G indicates two water-pipes extending from a funnel-shaped vessel, H, at one end of the car, at the top of the same, by means of which water may be supplied to the pipes from the ordinary station-tanks employed on railroads, or from any other suitable water-supply. The pipes extend longitudinally along the sides of the car over the troughs C, where they are perforated, in order to discharge water into said troughs.

Each stall is provided with two adjustable stanchions, I, which are loosely pivoted at their lower ends to bearings at the front edge of the trough. The upper ends of said stanchions extend through the slots K in an angular bracket secured to the car in the upper part of each stall. The said slots converge from the rear to the front of the bracket, and at their forward extremities are notched, as shown at L, into which notches the upper ends of the stanchions may be drawn and held by a clasp, M, or other fastening device, to secure the neck of the animal between said stanchions, the stanchions being adapted to fall back in the slots into the stall and out of the way when not in use. At the lower part of the sides of the car are formed the alternating apertures N, one at the rear of each animal, through which excremental matter may escape.

The operation of my invention will be readily understood in connection with the above description.

The animals are led in at the respective doors and secured in the stalls by fastening their necks between the stanchions. After being thus fastened it is unnecessary to free or remove them for feeding or watering, as the food and water can be supplied to the troughs, as before described, without trouble.

By thus arranging the stalls so that the animals may be secured head to rump, respectively, it will be impossible for the animals to injure each other when viciously inclined. The side partitions of the stalls also prevent the animals from injuring those in the adjoining stalls by keeping the rump of one animal away from the heads of the others.

Having thus fully described my invention, what I claim, and desire to secure by Letters Patent, is—

1. In combination with the stalls, their troughs, and devices for supplying the same, the adjustable stanchions loosely secured to bearings at the edge of the trough at their lower ends, and at their upper ends in converging slots in a bracket in the upper part of the stall, the said slots being notched at their forward ends and provided with suitable fastening devices by which they may be held together, substantially as and for the purposes specified.

2. In combination with the stalls, the troughs constructed with the front higher than the rear edge, and provided with a flange at the rear edge, extending through the side of the car to carry off overflow, substantially as specified.

3. The combination, in a stock-car, of the stalls and their troughs, the doors for supplying food, and the water-pipes extending from a common supply-funnel for supplying water, and the adjustable stanchions adapted to secure the animals and to be thrown back out of the way after use, substantially as specified.

In testimony whereof I affix my signature in presence of two witnesses.

SYLVESTER H. McGIBENY.

Witnesses:
CHAS. L. COOMBS,
H. J. ENNIS.